United States Patent [19]

Bryan

[11] 4,050,178
[45] Sept. 27, 1977

[54] FISHING ROD HOLDER

[76] Inventor: Hugh T. Bryan, 1312 Third Ave., Albany, Ga. 31707

[21] Appl. No.: 681,015

[22] Filed: Apr. 28, 1976

[51] Int. Cl.² .............................................. A01K 97/10
[52] U.S. Cl. .................... 43/212; 211/60 R; 248/536
[58] Field of Search ............... 248/520, 201, 219, 220, 248/302, 536, 538, 534; 9/1 D; 211/60 R, 70, 63, 68; 43/21.2, 15, 16, 17

[56] References Cited

U.S. PATENT DOCUMENTS

| 2,645,050 | 7/1953 | Golias | 43/21.2 |
| 3,140,069 | 7/1964 | McBurney et al. | 248/201 X |
| 3,543,432 | 12/1970 | Gates | 43/21.2 |
| 3,564,753 | 2/1971 | Fravel | 43/21.2 |
| 3,669,390 | 6/1972 | Nielson | 248/358 |
| 3,903,634 | 9/1975 | Miyamae | 43/21.2 |

Primary Examiner—Russell R. Kinsey
Assistant Examiner—Peter K. Skiff
Attorney, Agent, or Firm—A. Yates Dowell, Jr.

[57] ABSTRACT

A fishing rod holder apparatus including a pair of members mounted on the gunwale of a boat and adapted to support a fishing rod in a position such that the rod extends outwardly of the boat.

1 Claim, 4 Drawing Figures

FISHING ROD HOLDER

BACKGROUND OF THE INVENTION

1. Field of the Invention

This invention relates generally to apparatus for supporting elongated slender articles in a cantilever position, and relates particularly to apparatus mounted on a boat in a position to support one end of a fishing rod with the other end of the rod located exteriorly of the boat.

2. Description of the Prior Art

In the past many fishing poles have been provided with a fishing line having a hook at one end for receiving bait or a lure which is attractive to fish. The opposite end of the line has been connected to the end of a fish pole or rod or has been connected to a reel mounted on or adjacent to the handle of the rod. Frequently when fish are not attracted to the bait or lure, the fisherman merely holds the rod in his hands waiting for the fish to strike and cannot use his hands for other things, such as operating the boat or the like.

Some efforts have been made to provide apparatus for holding a fishing rod while the fisherman was not actively engaged in casting the hook or landing a fish and these prior art devices have included structures which were mounted on boats, tackle boxes, or other accessories, as well as holders which were mounted on a stake or body that could be driven into the ground along the banks of a river or other body of water so that the holders were selfsupporting. However, many of these prior art devices have not been entirely satisfactory since they were normally in the way when not in actual use and it has been difficult in many cases to remove the fishing rod from the holder after a fish has taken the bait or lure.

Also, in some political jurisdictions, laws have been passed which prohibit the permanent attachment of any metal object over one-half inch high to the top side of the gunwale of a boat having a power plant of 20 H.P. or more. These laws are for the safety of persons in the boat and some prior art structures are not within the limits of these laws.

Some examples of the prior art are the patents to Gates U.S. Pat. No. 3,327,978 and 3,543,432; Fravel U.S. Pat. No. 3,564,753; Whitfield U.S. Pat. No. 3,835,568; and the design patent to Erickson U.S. Pat. No. De. 221,279.

SUMMARY OF THE INVENTION

The present invention is embodied in a fishing rod holder having a first portion mounted in a generally vertical position on the side wall or gunwale of a boat and a second portion, which is less than one-half inch high, is mounted on the top surface of the gunwale and in spaced relationship to the first portion. The first portion includes a swingably mounted bail which normally is swung downwardly along the side wall of the boat when not in use, but which can be swung upwardly to a position overlying the handle end of the fishing rod. The second portion includes a cradle which is spaced outwardly of the bail a short distance so that one end of the fishing rod may be supported while the other end is cantilevered outwardly from the boat. When a fish takes the bait or lure, the fisherman merely grasps the rod outwardly of the bail and lifts the same so that the handle end of the rod is released from the bail at which time the bail swings downwardly by gravity so that the holder does not interfere with the fisherman while he is landing the fish.

It is an object of the invention to provide a fishing rod holder which is adapted to selectively support one end of a fishing rod while the other end of such rod is cantilevered outwardly therefrom and such holder is arranged in such a manner that it does not interfere with the fisherman after the rod has been released.

DESCRIPTION OF THE PREFERRED EMBODIMENTS

Figure 1:
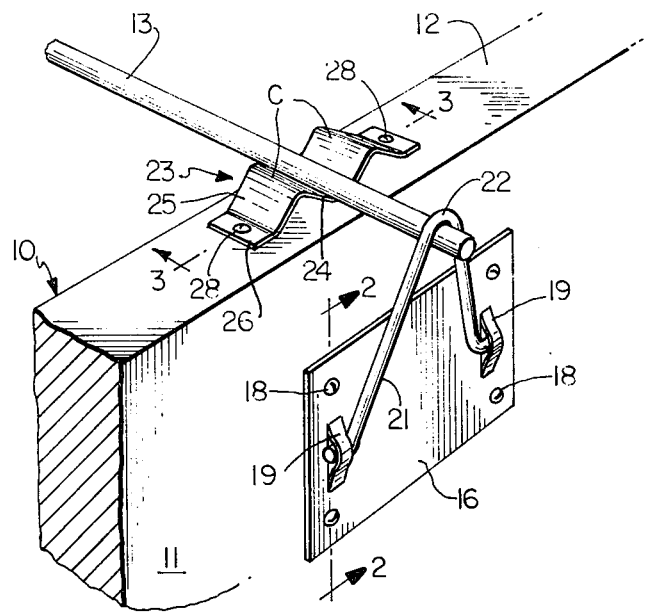
FIG. 1 is a perspective illustrating one application of the invention.

With continued reference to the drawing, a boat constructed of wood, metal, fiberglass or other material has a side wall or gunwale 10 which normally includes a generally vertical inner surface 11 and a top surface 12. One or more fishermen are carried by the boat and the boat is propelled either by a conventional motor or by oars across a body of water to a location where fish are likely to be. When the fishermen are actively fishing, each of such fishermen has a rod or pole 13 on which a line (not shown) is mounted and such line is provided at one end with a hook for bait or a lure which is attractive to the fish. As long as the fish are biting, the fisherman keeps the rod or pole in his hands so that the fish can be brought into the boat. However, when the fish are not biting and are not attracted to the bait or lure, it is not necessary for the fisherman to hold the rod.

Figure 2:
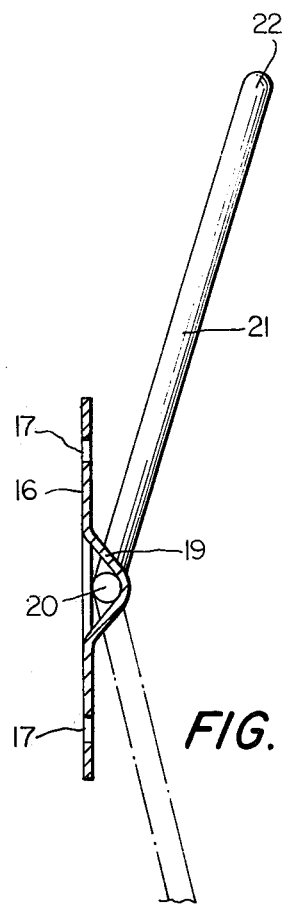
FIG. 2 is an enlarged section on the line 2—2 of FIG. 1.
Figure 3:
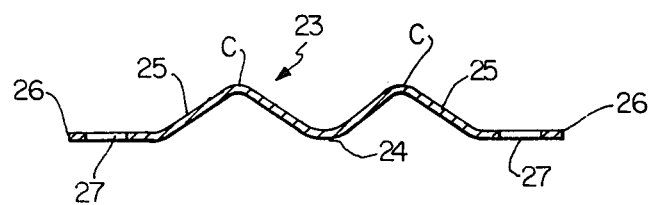
FIG. 3 is an enlarged section on the line 3—3 of FIG. 1.

In order to support the rod during periods of fishing inactivity, a mounting plate 16 is provided having a plurality of openings 17 which normally are located adjacent to each of the corners of the plate. Preferably the plate is constructed of generally flat sheet metal, such as aluminum or the like, and is mounted on the inner surface 11 of the gunwale by means of a plurality of screws, rivets or other fasteners 18, which pass through the openings 17. If desired, the mounting plate 16 may be mounted on the vertical surface by an adhesive or the like. Adjacent to each end of the mounting plate, an upstruck strap or band 19 is provided for rotatably receiving the ends 20 of a generally U-shaped bail 21. The bail normally is made of wire or rod stock having an inherent resiliency so that the ends 20 may be moved toward each other to locate such ends between the straps 19 and thereafter when the bail is released, the ends spring outwardly to a position beneath such straps. In this position the bail 21 is freely swingably supported by the straps so that the bail may be swung from an upper operative position, as shown in FIGS. 1 and 2, to a lower inoperative position, as shown in phantom lines in FIG. 2. Preferably the central or bight portion 22 of the bail is provided with a curvature generally complementary to the inner end or handle of the rod 13.

A cradle 23 having a generally U-shaped central portion 24 is provided for supporting the rod 13 in spaced relationship with the bail 21, and the central portion of such cradle is connected by side walls 25 to outwardly extending flanges 26. Each of the flanges 26 is provided at least one opening 27 for the reception of screws or other fasteners 28 by means of which the cradle is attached to the top surface 12 of the gunwale. It is noted that the connections between the central portion 24 and the side walls 25 are defined by spaced crests C which are no more than one-half inch above the gunwale. Instead of the fasteners 28, it is contemplated that the cradle 23 could be secured to the top surface 12 in any other desired manner, as by waterproof adhesives or the like.

Since the mounting plate 16, bail 21 and cradle 23 may be subjected to salt water and salty air, the metal parts may be coated with rubber or thermoplastic material or otherwise treated to delay or prevent oxidation.

Figure 4:
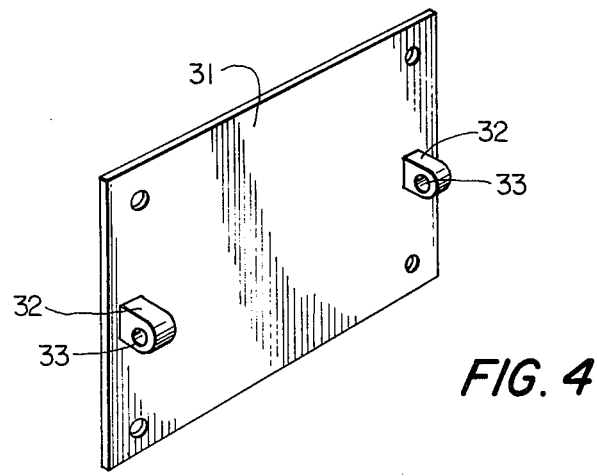
FIG. 4 is a perspective of a modified form of mounting plate.

With particular reference to FIG. 4, a modified form of mounting plate 31 is provided having a pair of spaced generally parallel ears 32 at opposite ends. Each of such ears is provided with an opening 33 for the reception of the ends 20 of the bail. In this embodiment the mounting plate 31 preferably is constructed of moldable thermoplastic material such as polyethylene, polypropylene, or the like.

In the operation of the device, when a fisherman desires to put the rod 13 down while leaving the hook in the water, such fisherman rests a portion of the rod adjacent to the inner end in the cradle 23 and thereafter the fisherman swings the bail 21 upwardly from an inoperative position to a position overlying the handle end of the rod. When the rod is released, the cradle 23 functions as a fulcrum and since the rod is cantilevered outwardly from the boat, the outer end of the rod is urged downwardly by gravity and the inner end is urged upwardly against the bail. If a fish should take the bait while the rod is in the holder, the fisherman grasps the rod and raises the outer end so that the rod is removed from the cradle and an upward arcuate movement of the rod releases the bail from the inner end thereof. When the bail is released, such bail swings downwardly by gravity so that it does not impede the movements of the fisherman in bringing the fish into the boat.

I claim:

1. A fishing rod holder for supporting a fishing rod in a cantilevered position from the gunwale of a boat with a minimum amount of protrusions extending from the gunwale, comprising a mounting plate, means for connecting said mounting plate in a generally vertical position on the gunwale, a generally U-shaped bail having outwardly extending opposite ends pivotally mounted to said mounting plate along a horizontal axis, said bail being normally urged by gravity into a vertical non-use position flush with said mounting plate and being selectively movable in a vertical arc to a use position to overlie the handle end of a fishing rod, cradle means mounted generally perpendicular to said mounting plate in a substantially horizontal plane along the upper surface of the gunwale with the uppermost portions of said cradle extending upwardly from the upper surface of the gunwale a distance of generally one-half inch or less, said cradle means having a central generally U-shaped portion for receiving a portion adjacent said handle of said fishing rod in spaced relationship to said bail, whereby a fishing rod can be selectively supported by said bail and said cradle and said bail being movable by gravity to said non-use position when the rod is removed from engagement therewith.

* * * * *